(12) United States Patent
Todoroki et al.

(10) Patent No.: US 8,993,937 B2
(45) Date of Patent: Mar. 31, 2015

(54) HEATER MODULE

(75) Inventors: Naoto Todoroki, Sagamihara (JP);
Yukiko Kinoshita, Okegawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/003,381

(22) PCT Filed: Feb. 28, 2012

(86) PCT No.: PCT/JP2012/054950
§ 371 (c)(1),
(2), (4) Date: Sep. 5, 2013

(87) PCT Pub. No.: WO2012/124471
PCT Pub. Date: Sep. 20, 2012

(65) Prior Publication Data
US 2013/0341319 A1    Dec. 26, 2013

(30) Foreign Application Priority Data

Mar. 11, 2011    (JP) ................................. 2011-054084

(51) Int. Cl.
| H05B 3/06 | (2006.01) |
| H01M 10/615 | (2014.01) |
| H01M 10/625 | (2014.01) |
| H01M 10/657 | (2014.01) |
| H05B 3/26 | (2006.01) |

(Continued)

(52) U.S. Cl.
CPC ...... *H01M 10/5006* (2013.01); *H01M 10/5016* (2013.01); *H01M 10/5081* (2013.01); *H05B 3/26* (2013.01); *H05B 3/06* (2013.01); *H05B 3/22* (2013.01); *H01M 2/1077* (2013.01); *H01M 2220/20* (2013.01)

USPC ............................ 219/526; 219/531; 219/535

(58) Field of Classification Search
CPC .................... H01M 10/5006; H01M 10/5016; H01M 10/5081; H01M 2/1077; H01M 2/1083; H01M 2220/20; H05B 3/06; H05B 3/22; H05B 3/26

See application file for complete search history.

(56) References Cited

U.S. PATENT DOCUMENTS 7,964,827 B2    6/2011    Suzuki et al.

FOREIGN PATENT DOCUMENTS

| EP | 2 148 385 A1 | 1/2010 |
| JP | 8-256950 A | 10/1996 |

(Continued)

OTHER PUBLICATIONS

Korean Office Action dated Jun. 25, 2014, 3 pgs.

(Continued)

*Primary Examiner* — Shawntina Fuqua
(74) *Attorney, Agent, or Firm* — Foley & Lardner LLP

(57) ABSTRACT

A heater module (22L, 22R) of the present invention is provided along a heated surface (13CLa) of an object to be heated (13CL, 13CR). The heater module includes a plate-like heater body (34) that faces the heated surface of the object to be heated, and an insulating holder (31) that holds the plate-like heater body in a manner as to face the heated surface of the object to be heated. The insulating holder is fixed, at one edge thereof, to a mounting surface (14a) on which the object to be heated is mounted, and located on one side of the plate-like heater body away from the heated surface of the object to be heated. The insulating holder is provided, at another edge opposite to the one edge, with a regulation member (31a) that projects toward the heated surface of the object to be heated from the plate-like heater body.

5 Claims, 6 Drawing Sheets

(51) Int. Cl.
*H05B 3/22* (2006.01)
*H05B 3/58* (2006.01)
*H01M 2/10* (2006.01)

(56) References Cited

FOREIGN PATENT DOCUMENTS

| JP | 9-190840 A | 7/1997 |
| JP | 10-032021 A | 2/1998 |
| JP | 2000-243435 | * 9/2000 |
| JP | 2000-243435 A | 9/2000 |
| JP | 2005-286071 A | 10/2005 |
| JP | 3131704 U | 5/2007 |
| JP | 2008-186621 A | 8/2008 |

OTHER PUBLICATIONS

Supplementary Search Report dated Oct. 7, 2014, 5 pgs.

* cited by examiner

HEATER MODULE

TECHNICAL FIELD

The present invention relates to a heater module effective in controlling the temperature of a battery module made by stacking a number of battery shells.

BACKGROUND ART

There is known a heater module used for controlling the temperature of a battery module made by stacking a number of battery shells, as described in Patent Literature 1.

In Patent Literature 1, a heater body tightly contacts the outer side surface of a casing of a battery pack that stores a number of battery modules, and the heater module is attached to the casing of the battery pack by using a heater unit casing. Also, a heat insulating sheet is placed between the surface of the heater body that faces away from the outer side surface of the casing of the battery pack, and the heater unit casing.

CITATION LIST

Patent Literature

Patent Literature 1: Japanese Patent Unexamined Publication No. 2008-186621

SUMMARY OF INVENTION

However, in the heater module described in Patent Literature 1, the battery modules, which are objects to be heated by the heater body, are not heated directly by the heater body. Specifically, the casing of the battery pack that stores the battery modules is heated by the heater body, and the battery modules are indirectly heated by heat conduction from the casing of the battery pack to the battery modules. Therefore, there has been a problem that heating efficiency for the battery modules is low.

In order to solve this problem, it is considered to arrange the heater body adjacent to the battery modules and heat the battery modules directly by the heater body. However, according to the configuration described in Patent Literature 1, the heater body may come into contact with heated surfaces of the battery modules when the heater modules vibrate or are inclined. The contact with the surfaces may cause damage to the heater body or electric leakage. Thus, particular measures for preventing such a problem are required.

The present invention has been accomplished in view of the conventional problem. An object of the present invention is to provide a heater module capable of solving the above-mentioned conventional problem with an inexpensive and simple configuration even if a heater body closely faces and directly heats a heated surface of an object to be heated.

A heater module according to an aspect of the present invention is provided along a heated surface of an object to be heated. The heater module includes: a plate-like heater body that faces the heated surface of the object to be heated; and an insulating holder that holds the plate-like heater body in a manner as to face the heated surface of the object to be heated. The insulating holder is fixed, at one edge of the insulating holder, to a mounting surface on which the object to be heated is mounted, and located on one side of the plate-like heater body away from the heated surface of the object to be heated. The insulating holder is provided, at another edge opposite to the one edge, with a regulation member that projects toward the heated surface of the object to be heated from the plate-like heater body.

DESCRIPTION OF EMBODIMENTS

Figure 1:
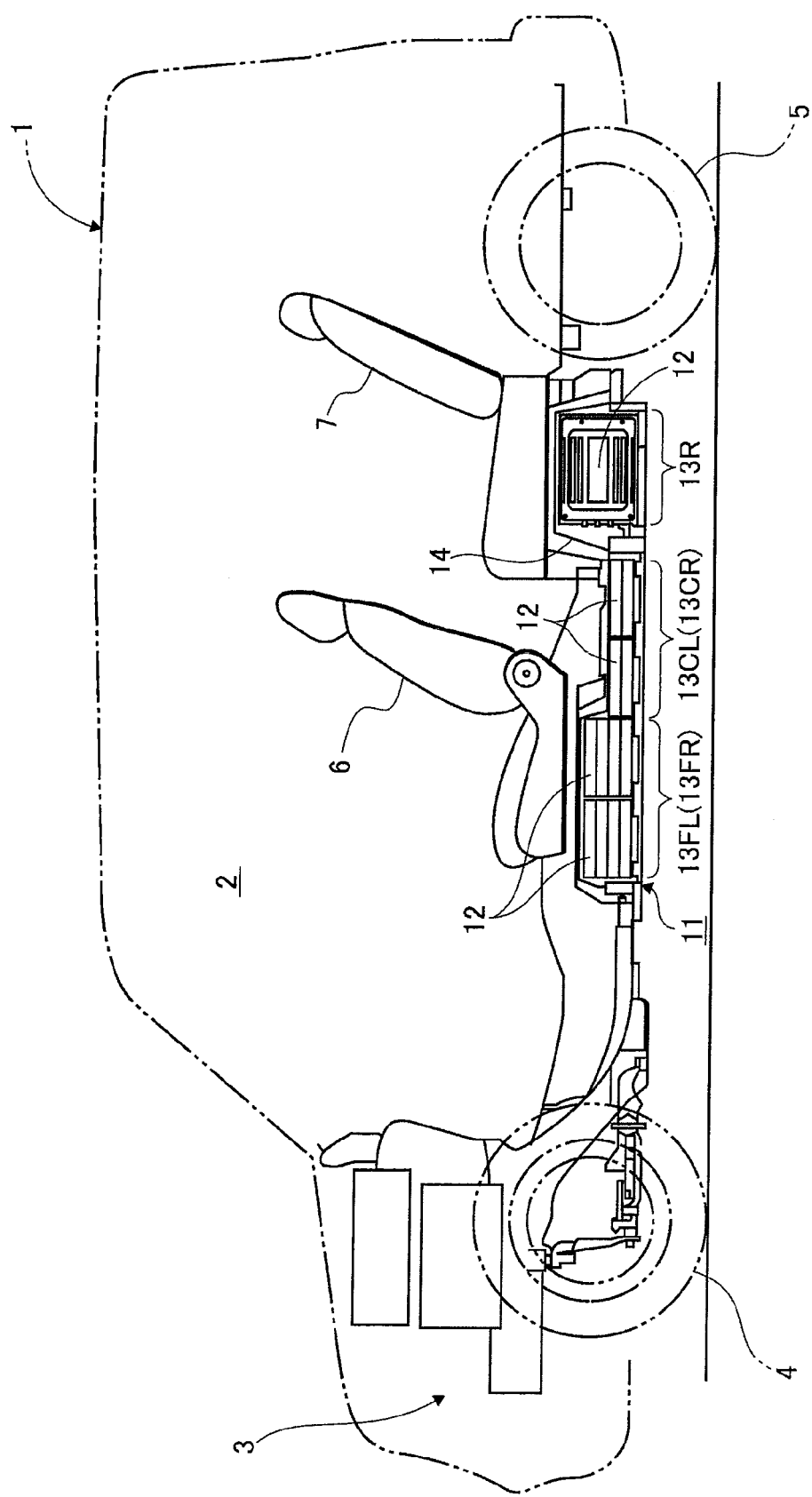
FIG. 1 is a side view showing a state where a battery pack, which employs a heater module according to an embodiment of the present invention, is attached inside of a battery storage space directly beneath a vehicle floor panel.

An embodiment of the present invention will be described below with reference to the drawings. It should be noted that dimensional ratios in the drawings are magnified for convenience of explanation, and may be different from actual ratios.

Figure 2:
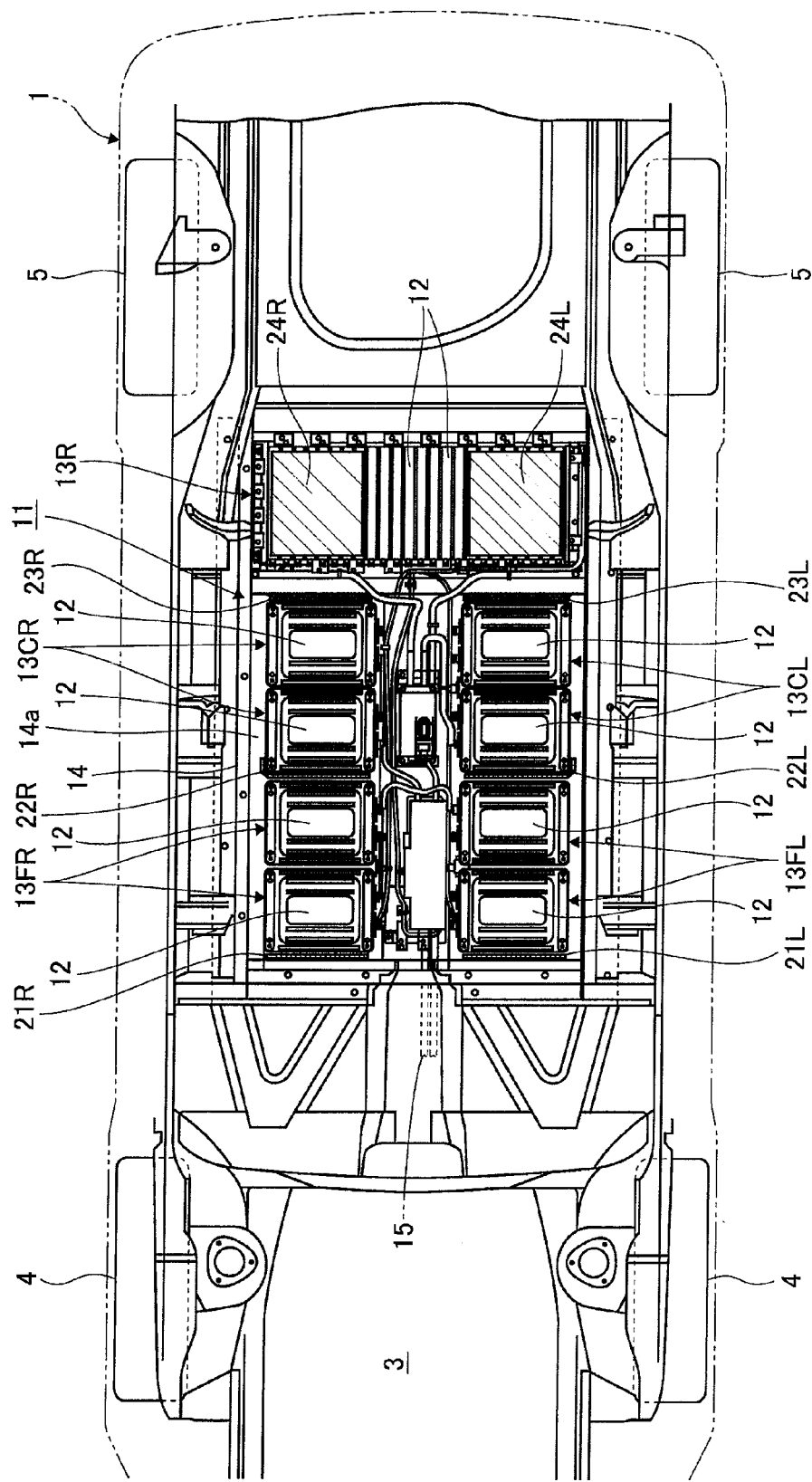
FIG. 2 is a plan view showing a state where the battery pack shown in FIG. 1 is attached inside of the battery storage space directly beneath the vehicle floor panel.
Figure 3:
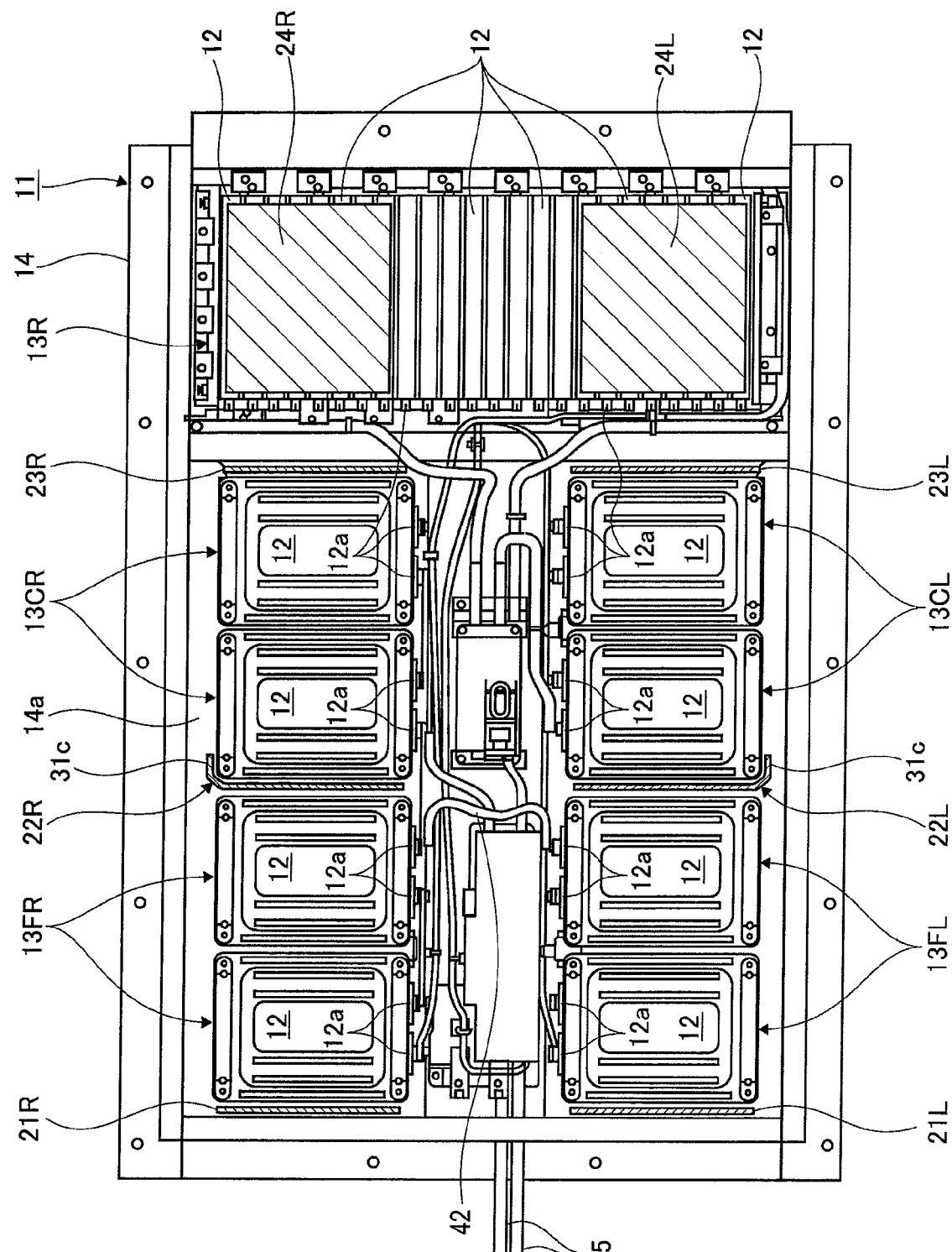
FIG. 3 is a plan view of the battery pack, showing a state where the battery pack shown in FIG. 2 is removed from the battery storage space directly beneath the vehicle floor panel.

FIG. 1 and FIG. 2 show a state where a battery pack, which employs a heater module according to the embodiment of the present invention, is attached inside of a battery storage space directly beneath a vehicle floor panel. FIG. 3 shows a state where the battery pack shown in FIG. 1 and FIG. 2 is removed from the battery storage space of the vehicle.

Battery Pack

First, the vehicle battery pack shown in FIG. 1 to FIG. 3 is explained below. In FIG. 1 and FIG. 2, reference numeral 1 denotes a vehicle body, reference numeral 2 denotes an interior space, and reference numeral 3 denotes a motor compartment in which an electric motor for driving is mounted. Further, reference numeral 4 denotes left and right front wheels, reference numeral 5 denotes left and right rear wheels, reference numeral 6 denotes a front seat, reference numeral 7 denotes a rear seat, and reference numeral 11 denotes a vehicle battery pack.

The battery pack 11 includes a plurality of battery modules 13FL, 13FR, 13CL, 13CR, and 13R, each of which is made by stacking a number of battery shells 12. The battery modules 13FL, 13FR, 13CL, 13CR, and 13R are stored in a common battery pack casing 14 to configure a single unit, as shown in FIG. 3.

In particular, the battery modules 13FL on the front left side and the battery modules 13FR on the front right side are provided directly beneath the floor panel provided under the left and right front seats 6, as shown in FIG. 1 and FIG. 2. Also, the battery module 13R at the rear is provided directly beneath the floor panel at the left and right rear seats 7. Moreover, the battery modules 13CL on the center left side and the battery modules 13CR on the center right side are provided directly underneath the floor panel that is located under feet in the rear seats and extends between the left and right front seats 6 and the left and right rear seats 7. The battery pack 11 holds and stores these battery modules in the battery pack casing 14 so as to configure a single unit.

As shown in FIG. 1 to FIG. 3, in the battery modules 13FL on the front left side, four of the battery shells 12 are stacked in a vertical direction and transversely with respect to the vehicle front-rear direction. Two of the modules, each having four of the battery shells 12, are apposed in the vehicle front-rear direction as a pair. Similarly, in the battery modules 13FR on the front right side, four of the battery shells 12 are stacked in the vertical direction and transversely with respect to the vehicle front-rear direction. Two of the modules, each having four of the battery shells 12, are apposed in the vehicle front-rear direction as a pair.

Further, as shown in FIG. 1 to FIG. 3, in the battery module 13R at the rear, a number of the battery shells 12 are placed longitudinally with respect to the vehicle front-rear direction and stacked in the vehicle width direction. The battery shells 12 in the battery module 13R are stacked so as to have almost the same length as the entire length of the rear seats 7.

Further, as shown in FIG. 1 to FIG. 3, in the battery modules 13CL on the center left side, two of the battery shells 12 are placed transversely with respect to the vehicle front-rear direction and stacked in the vertical direction. Two of the modules, each having two of the battery shells 12, are apposed in the vehicle front-rear direction as a pair. Similarly, in the battery modules 13CR on the center right side, two of the battery shells 12 are placed transversely with respect to the vehicle front-rear direction and stacked in the vertical direction. Two of the modules, each having two of the battery shells 12, are apposed in the vehicle front-rear direction as a pair.

As shown in FIG. 3, electrode terminals 12a are provided in the battery shells 12 that form the battery modules 13FL on the front left side and the battery modules 13FR on the front right side. The battery modules 13FL and 13FR are arranged in a manner such that the electrode terminals 12a of the battery modules 13FL and the electrode terminals 12a of the battery modules 13FR face each other.

Further, the electrode terminals 12a are provided in the battery shells 12 that form the battery modules 13CL on the center left side and the battery modules 13CR on the center right side. The battery modules 13CL and 13CR are arranged in a manner such that the electrode terminals 12a of the battery modules 13CL and the electrode terminals 12a of the battery modules 13CR face each other.

As shown in FIG. 3, the battery module 13R at the rear is arranged in a manner such that all of the electrode terminals 12a of the battery shells 12 that form the battery module 13R, face to the front of the vehicle.

As shown in FIG. 2 and FIG. 3, a common power supply cable 42 is arranged in the space at the midpoint in the vehicle width direction between the battery modules 13FL and 13FR on the front side, and in the space at the midpoint in the vehicle width direction between the battery modules 13CL and 13CR at the center. The electrode terminals 12a of the battery shells 12 that form each of the battery modules 13FL, 13FR, 13CL, 13CR, and 13R are connected to motor power-supply lines 15 through the power supply cable 42. The motor power-supply lines 15 are electrically connected to an electric motor and an inverter in the motor compartment 3.

Heater Module

Next, heater modules in the battery pack 11 are explained below based on FIG. 2 and FIG. 3. In FIG. 2 and FIG. 3, hatching has been added to the heater modules for convenience of explanation.

The heater modules function to heat the battery modules 13FL, 13FR, 13CL, 13CR, and 13R in the battery pack 11 in order to prevent the battery modules from freezing when not in use. In other words, the battery modules 13FL and 13FR on the front side have a large heat capacity, as four of the battery shells 12 are stacked therein as explained above. In contrast, since the battery modules 13CL and 13CR at the center are each made of two stacked battery shells 12 and thus have a small heat capacity, the temperature thereof easily decreases. Hence, in this embodiment, the thin heater modules 21L and 21R are provided only on the front sides of the battery modules 13FL and 13FR, as shown in FIG. 2 and FIG. 3. But for the battery modules 13CL and 13CR at the center, the thin heater modules 22L and 22R are provided on the front sides thereof, and the thin heater modules 23L and 23R are provided on the rear sides thereof.

The battery module 13R at the rear includes the stacked battery shells 12 more than the battery modules 13FL and 13FR on the front side. The battery module 13R thus has the largest heat capacity, and the temperature thereof does not easily decrease. Therefore, in the battery module 13R at the rear, the heater modules 24L and 24R are provided only above both ends of the battery shells 12 in the stacking direction.

The heater modules 21L and 21R are arranged adjacent to the front sides of the battery modules 13FL on the front left side and the battery modules 13FR on the front right side, respectively, in a vertical state. Also, the heater modules 22L and 22R are arranged adjacent to the front sides of the battery modules 13CL on the center left side and the battery modules 13CR on the center right side, respectively, in a vertical state. Further, the heater modules 23L and 23R are arranged adjacent to the rear sides of the battery modules 13CL on the center left side and the battery modules 13CR on the center right side, respectively, in a vertical state. As explained below, the heater modules 21L, 21R, 22L, 22R, 23L and 23R are attached and fixed to a battery module mounting surface 14a of the battery pack casing 14.

The heater modules 24L and 24R are provided on both ends of the battery module 13R at the rear in the stacking direction of the battery shells. In addition, the heater modules 24L and 24R are attached and fixed to the top of the stacked battery module 13R, in other words, on side surfaces of the stacked battery module 13R.

As described above, the power supply cable 42 is arranged in the space at the midpoint between the battery modules 13FL and 13FR on the front side, and in the space at the midpoint between the battery modules 13CL and 13CR at the center. As described below, each heater module includes a power source connection terminal that electrically connects a plate-like heater body 34 having a plate-like heating element 32 and a heat equalizing plate 33, to the power supply cable 42. Therefore, the power source connection terminals of the heater modules 21L and 21R are preferably installed towards and close to the space at the midpoint between the battery modules 13FL and 13FR on the front side. Similarly, the power source connection terminals of the heater modules 22L, 22R, 23L, 23R, 24L and 24R are preferably installed towards and close to the space at the midpoint between the battery modules 13CL and 13CR at the center.

Accordingly, the power source connection terminals of the heater modules 21L and 21R arranged on the front sides of the battery modules 13FL on the front left side and the battery modules 13FR on the front right side, are located in mutually proximate end portions of the heater modules 21L and 21R. Also, the power source connection terminals of the heater modules 23L and 23R arranged on the rear sides of the battery modules 13CL on the center left side and the battery modules 13CR on the center right side, are located in mutually proximate end portions of the heater modules 23L and 23R. Hence, as shown in FIG. 2 and FIG. 3, the heater modules 21L and 21R, and the heater modules 23L and 23R can be formed into a plate shape.

As shown in FIG. 3, there is no neighboring battery module on the front sides of the battery modules 13FL and 13FR. Therefore, it is possible to secure spaces for placing the power source connection terminals in the peripheries of the mutually proximate end portions of the heater modules 21L and 21R, and this enables the power source connection terminals of the heater modules 21L and 21R to be arranged in the manner explained above. Similarly, there is no neighboring battery module at the rear of the battery modules 13CL and 13CR. Therefore, it is possible to secure spaces for placing the power source connection terminals in the peripheries of the mutually proximate end portions of the heater modules 23L and 23R, and this enables the power source connection terminals of the heater modules 23L and 23R to be arranged in the manner explained above.

On the other hand, the battery modules 13FL on the front left side and the battery modules 13FR on the front right side are arranged next to the vehicle front sides of the battery modules 13CL on the center left side and the battery modules 13CR on the center right side, respectively. Therefore, it is difficult to secure spaces for arranging the power source connection terminals of the heater modules 22L and 22R in the peripheries of the mutually proximate end portions of the heater modules 22L and 22R arranged on the front sides of the battery modules 13CL and 13CR at the center.

Figure 4:
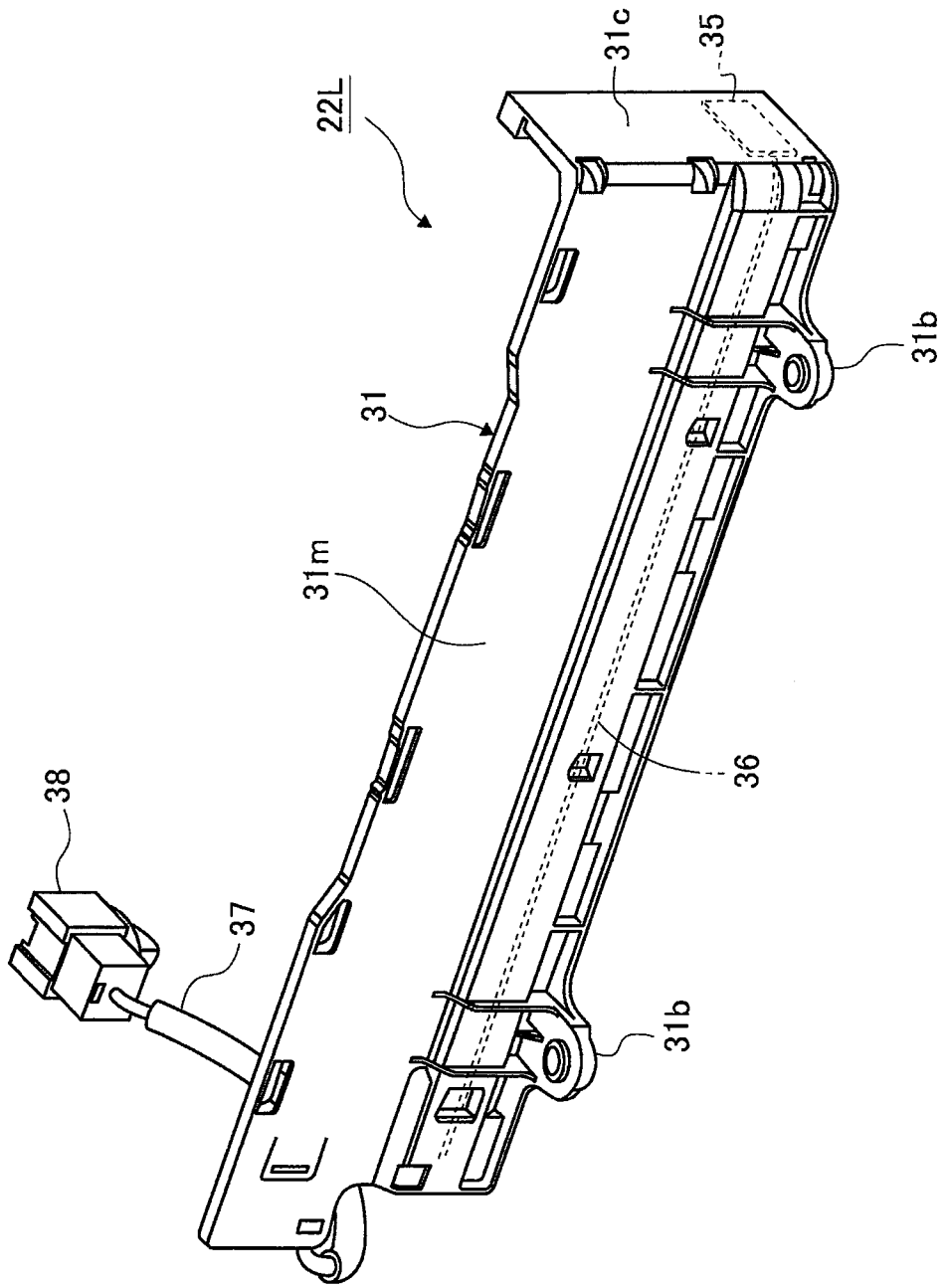
FIG. 4 is a perspective view showing the heater module according to the embodiment of the present invention used for the battery pack shown in FIG. 2 and FIG. 3.
Figure 5:
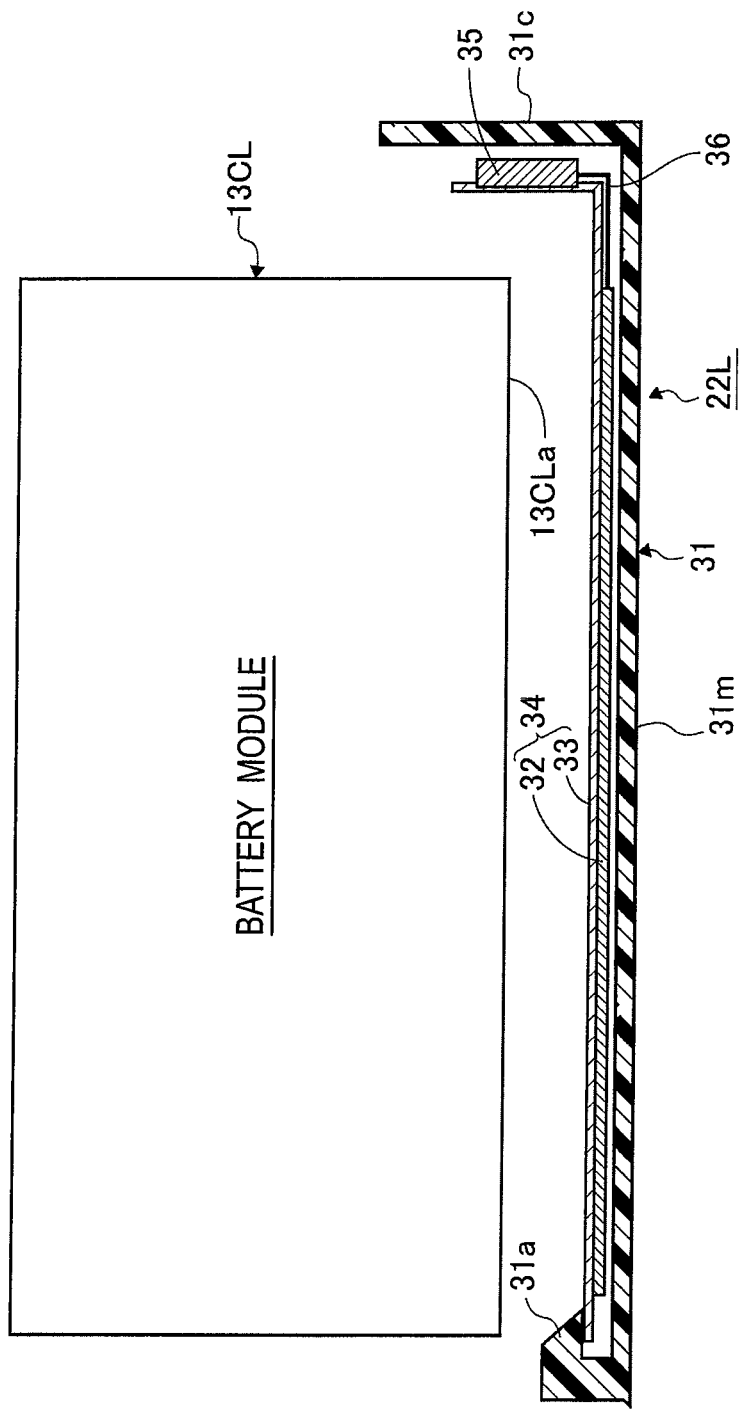
FIG. 5 is a longitudinal cross-sectional view of the heater module shown in FIG. 4.
Figure 6:
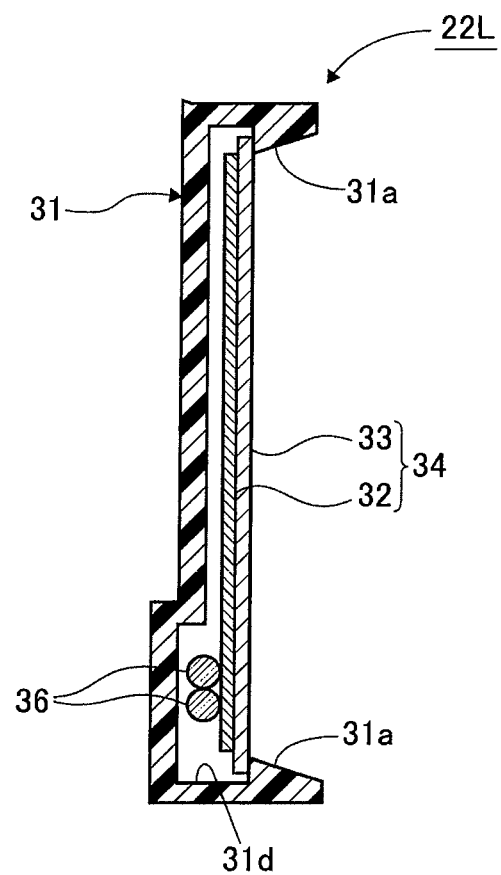
FIG. 6 is a vertical cross-sectional view of the heater module shown in FIG. 4.

Thus, in this embodiment, the heater modules 22L and 22R arranged in a vertical state on the front sides of the battery modules 13CL and 13CR at the center, have the configuration shown in FIG. 4 to FIG. 6. FIG. 4 is a perspective view showing the entire heater module 22L, FIG. 5 is a longitudinal cross-sectional view of the heater module 22L, and FIG. 6 is a vertical cross-sectional view of the heater module 22L. As shown in FIG. 4 to FIG. 6, the heater module 22L includes an insulating holder 31 made of an insulating material such as a resin, and the plate-like heater body 34 made by joining the plate-like heating element 32 and the heat equalizing plate 33 together. The plate-like heating element 32 is a conductor that generates Joule heat by allowing an electric current from the power supply cable 42 to pass therethrough. The heat equalizing plate 33 is a plate-like body that equally transfers heat generated by the plate-like heating element 32 to the battery modules.

As shown in FIG. 5 and FIG. 6, the plate-like heater body 34 is placed along one side surface of the insulating holder 31. In this case, the plate-like heating element 32 of the plate-like heater body 34 is located on the side closer to the insulating holder 31, and the heat equalizing plate 33 is located in a manner as to be exposed on the side away from the insulating holder 31. A plurality of heater body locking portions 31a capable of snap-fit type locking is provided in edge portions of the insulating holder 31. With these heater body locking portions 31a, the insulating holder 31 can lock the plate-like heater body 34 in the above-mentioned layout. This locked state can provide a layer of air between the insulating holder 31 and the plate-like heating element 32.

The heater module 22L having the foregoing configuration is provided with lugs 31b at the bottom of the insulating holder 31, as shown in FIG. 4. The heater module 22L in a vertical state is attached onto the battery module mounting surface 14a of the battery pack casing 14 via these lugs 31b. In this case, as shown in FIG. 5, the heater module 22L is attached in a manner such that the heat equalizing plate 33 of the plate-like heater body 34 proximately faces a heated surface 13CLa located on one side of the battery module 13CL in a laid state.

As shown in FIG. 5, the plural heater body locking portions 31a are integrally formed in the insulating holder 31 in a manner as to project from the plate-like heater body 34 toward the heated surface 13CLa of the battery module 13CL on the center left side.

As explained above, the battery modules 13FL and 13FR on the front side are arranged immediately next to the vehicle front sides of the battery modules 13CL and 13CR at the center, respectively. Therefore, it is difficult to secure spaces for arranging the power source connection terminals of the heater modules 22L and 22R in the peripheries of the mutually proximate end portions of the heater modules 22L and 22R arranged on the front sides of the battery modules 13CL and 13CR.

Thus, in the present embodiment, each of the insulating holders 31 of the heater modules 22L and 22R is bent at least on one end in the extending direction along the battery module mounting surface 14a, as shown in FIG. 4 and FIG. 5. In other words, the end portions in the longitudinal direction of the heater modules 22L and 22R that are towards the vehicle front side, are bent along corner portions of the corresponding battery modules 13CL and 13CR with respect to main surfaces 31m onto which the plate-like heater bodies 34 are attached.

As shown in FIG. 3, the bent end portions 31c of the insulating holders 31 are located outside of the region where the corresponding battery modules 13CL on the center left side and battery modules 13CR on the center right side, are mounted. Normally, an extra space is generally made outside of the mounting region for the battery modules 13CL on the center left side and the battery modules 13CR on the center right side, for safety reasons at the time of a side impact crash of another vehicle. Therefore, it is possible to place the bent end portions 31c of the insulating holders 31 in this extra space.

As shown in FIG. 4 and FIG. 5, the power source connection terminal of the heater module 22L, that is, the power source connection terminal 35 connected to the plate-like heater body 34, is provided on the inner side of the bent end portion 31c of the insulating holder 31. Namely, the power source connection terminal 35 is attached to the L-shaped end portion of the heat equalizing plate 33 extending along the inner side of the bent end portion 31c. As shown in FIG. 6, a heater harness 36 extending from the power source connection terminal 35 is stored in a harness cabling groove 31d provided in the insulating holder 31. Further, as shown in FIG. 4, the heater harness 36 is extended to the opposite end of the insulating holder 31 where the end portion of the heater harness 36 is connected to a lead wire 37 provided in the end portion of the insulating holder 31.

Moreover, a connector 38 is provided in the distal end of the lead wire 37. This connector 38 is electrically connected to the power supply cable 42 that is arranged in the space at the midpoint in the vehicle width direction as explained above. Thus, an electric current is fed from the power source to the heater module 22L, in other words, to the plate-like heating element 32 of the plate-like heater body 34.

It could be considered that the power source connection terminal 35 of the plate-like heater body 34 is arranged at the midpoint of the insulating holder 31 in a longitudinal direction, and is placed between the insulating holder 31 and the plate-like heating element 32. In this case, however, the thickness of the heater module 22L is increased, and the heater module 22L cannot be inserted into the limited space between the battery modules 13CL on the center left side and the battery modules 13FL on the front left side.

Effects of the Embodiment

The heater module 22L for the battery module 13CL on the center left side of the heater modules according to the present embodiment, includes the plate-like heater body 34 that faces the heated surface 13CLa of the battery module 13CL in the laid state. As shown in FIG. 5, the insulating holder 31 is fixed, at one edge, onto the battery module mounting surface 14a on which the battery module 13CL is mounted. The insulating holder 31 is placed on the surface (on the back surface) of the plate-like heater body 34 away from the heated surface 13CLa of the battery module 13CL. Since the insulating holder 31 holds the plate-like heater body 34 to come face-to-face with the heated surface 13CLa, the plate-like heater body 34 directly heats the heated surface 13CLa. Further, the presence of the layer of air between the heated surface 13CLa and the plate-like heater body 34 in addition to the layer of air between the back surface of the plate-like heater body 34 and the insulating holder 31, can enhance the effect of heating the battery module 13CL.

The plate-like heater body 34 is composed of a joined body of the plate-like heating element 32 and the heat equalizing plate 33, and the heat equalizing plate 33 faces the heated surface 13CLa. This arrangement allows the heat equalizing plate 33 to heat the heated surface 13CLa evenly, thereby preventing an uneven temperature distribution in the heated surface 13CLa.

The heater body locking portions 31a, which are provided at other edges on the opposite side of the one edge of the insulating holder 31 to lock the plate-like heater body 34, project toward the heated surface 13CLa from the plate-like heater body 34. These heater body locking portions 31a serving as regulation members hit the heated surface 13CLa when the heater module 22L vibrates or is inclined, and thereby prevent the plate-like heater body 34 from coming into contact with the heated surface 13CLa. Accordingly, damage to the plate-like heater body 34 or electric leakage caused by the contact with the heated surface 13CLa can be prevented. This effect can be achieved simply by providing the heater body locking portions 31a in the insulating holder 31 to project in the manner described above. Such an effect is possible with the inexpensive and simple configuration and therefore, has a significant advantage in cost and weight.

Further, the end portions of the insulating holders 31 away from the space at the midpoint in the vehicle width direction, are bent along the corner portions of the corresponding battery module 13CL on the center left side and battery module 13CR on the center right side. The bent end portions 31c of the insulating holders 31 increase the intensity of fixation on the battery module mounting surface 14a when the heater module 22L vibrates or is inclined. As a result, damage to the plate-like heater body 34 or electric leakage caused by the contact with the heated surface 13CLa can surely be prevented.

The bent end portions 31c of the insulating holders 31 are located outside of the region, but within the battery module mounting surface 14a, where the corresponding battery modules 13CL on the center left side and battery modules 13CR on the center right side are mounted. Thus, the bent end portions 31c of the insulating holders 31 can be provided while utilizing the extra space provided for safety reasons at the time of a side impact crash of another vehicle.

The extra space in which the bent end portions 31c of the insulating holders 31 are located, contributes to providing the power source connection terminal 35 of the heater module 22L (the plate-like heater body 34) in the bent end portion 31c with no limitation. Thus, even when there is no available space for the power source connection terminal 35 in the end portion of the heater module 22L adjacent to the space at the midpoint in the vehicle width direction, the provision of the power source connection terminal 35 of the heater module 22L is possible.

The entire content of Japanese Patent Application No. P2011-054084 (filed on Mar. 11, 2011) is herein incorporated by reference.

Although the present invention has been described above by reference to the embodiment, the present invention is not limited to the description thereof, and it will be apparent to those skilled in the art that various modifications and improvements can be made.

INDUSTRIAL APPLICABILITY

The heater module of the present invention uses the insulating holder to attach the plate-like heater body in a manner as to face the heated surface of the object to be heated. The insulating holder is located on one side of the plate-like heater body away from the heated surface of the object to be heated. Therefore, the plate-like heater body directly heats the object to be heated so as to improve the heating efficiency.

In addition, the heater body locking portions provided in the insulating holder to lock the plate-like heater body project toward the heated surface of the object to be heated from the plate-like heater body. The heater body locking portions hit the heated surface of the object to be heated when the heater module vibrates or is inclined, and thereby prevent the plate-like heater body from coming into contact with the heated surface of the object to be heated. Accordingly, damage to the plate-like heater body or electric leakage caused by the contact with the heated surface of the object to be heated, can be prevented. This effect can be achieved simply by providing the heater body locking portions in the insulating holder to project in the manner described above. Such an effect is possible with the inexpensive and simple configuration and therefore, has a significant advantage in cost and weight.

REFERENCE SIGNS LIST

11 Battery pack
13CL, 13CR Battery module (object to be heated)
13CLa Heated surface
14a Battery module mounting surface
22L, 22R Heater module
31 Insulating holder
31a Heater body locking portion (regulation member)
31c Bent end portion
32 Plate-like heating element
33 Heat equalizing plate
34 Plate-like heater body

The invention claimed is:

1. A heater module provided along a heated surface of an object to be heated, the heater module comprising:
   a plate-like heater body that faces the heated surface of the object to be heated; and
   an insulating holder made of an insulating material that holds the plate-like heater body in a manner as to face the heated surface of the object to be heated,
   the insulating holder being fixed, at one edge of the insulating holder, to a mounting surface on which the object to be heated is mounted, and located on one side of the plate-like heater body away from the heated surface of the object to be heated, and the insulating holder being provided, at another edge opposite to the one edge, with a regulation member integrally formed in the insulating holder that projects toward the heated surface of the object to be heated from the plate-like heater body, and wherein at least a portion of the regulation member is located between the plate-like heater body and the heated surface of the object to be heated.

2. The heater module according to claim 1, wherein the regulation member is a heater body locking portion with which the insulating holder locks the plate-like heater body.

3. The heater module according to claim 1, wherein the plate-like heater body is a joined body of a plate-like heating element and a heat equalizing plate, and the heat equalizing plate is located to face the heated surface of the object to be heated.

4. The heater module according to claim 1, wherein the insulating holder is fixed to the mounting surface in a vertical state, and at least one end of the insulating holder in an extending direction along the mounting surface is bent.

5. The heater module according to claim 4, wherein more than one object to be heated serves as battery modules arranged in a battery pack, and the heated surface of each object to be heated is a surface of each battery module in a laid state, a bent end portion formed by bending the insulating holder is provided only in one end of the insulating holder, and the insulating holder is fixed onto the mounting surface in the vertical state in a manner such that the bent end portion is located outside of a region in the battery pack where the battery modules are arranged.

* * * * *